March 2, 1943.  A. LENTZ  2,312,424
LIFTING MECHANISM FOR TRACTOR OPERATED IMPLEMENTS
Filed July 6, 1940  2 Sheets-Sheet 1
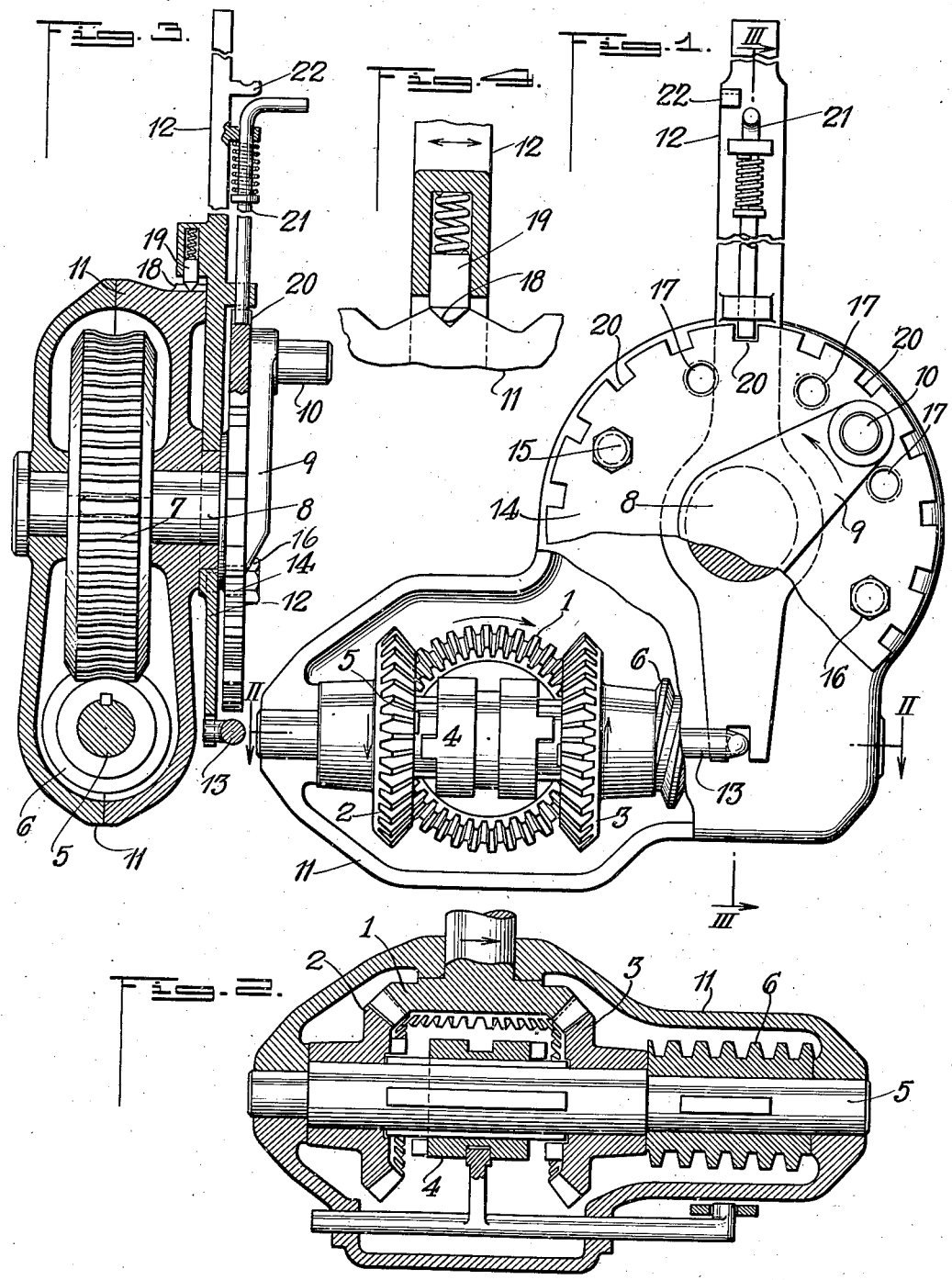
INVENTOR
ANTON LENTZ.
BY Karl A. Mayr
ATTORNEY

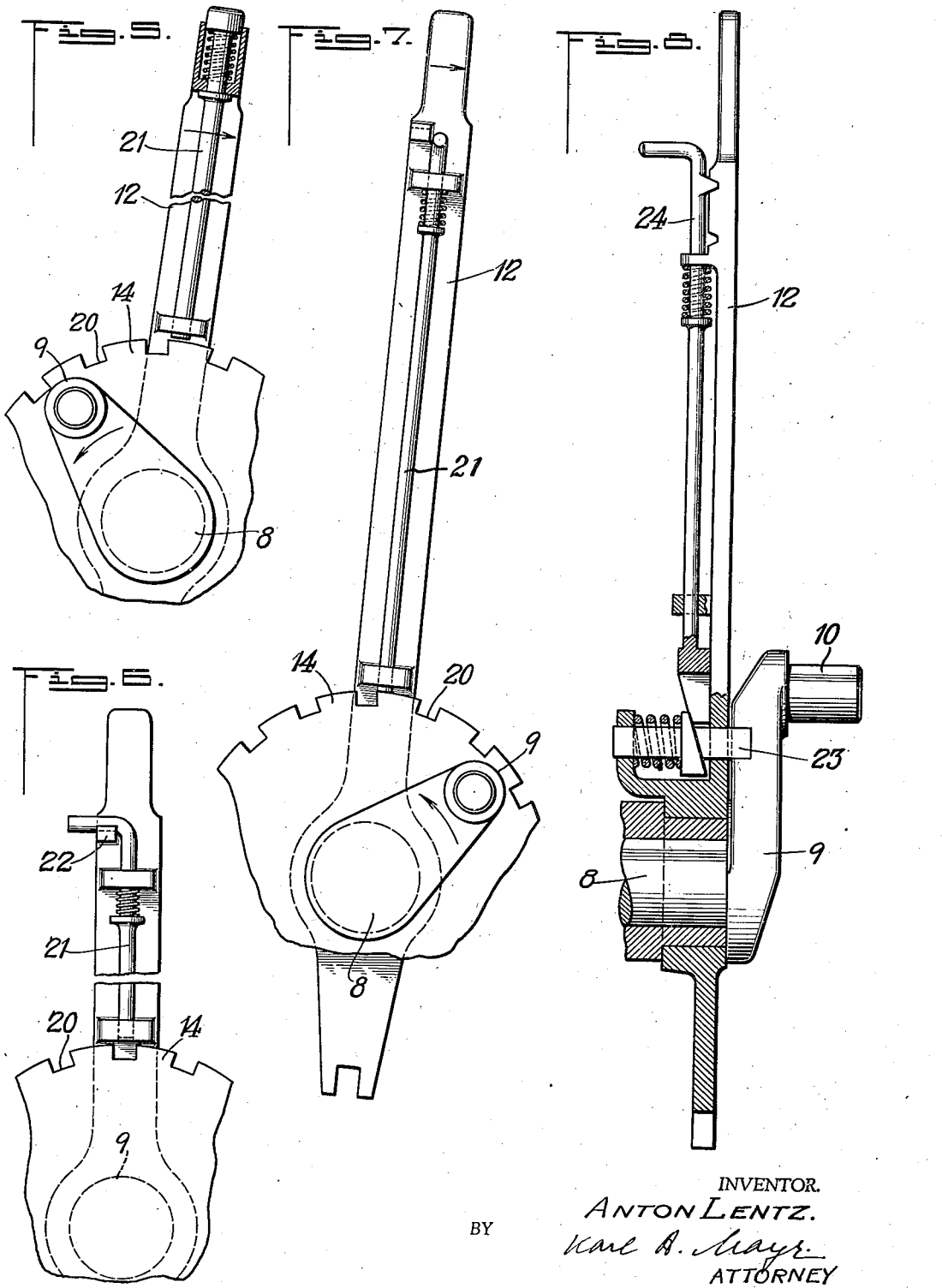

Patented Mar. 2, 1943

2,312,424

UNITED STATES PATENT OFFICE 2,312,424

LIFTING MECHANISM FOR TRACTOR OPERATED IMPLEMENTS

Anton Lentz, Heidelberg, Germany; vested in the Alien Property Custodian

Application July 6, 1940, Serial No. 344,188
In Germany September 1, 1939

13 Claims. (Cl. 97—50)

The present invention relates to a lifting and lowering gear for trailers attached to tractors, more particularly to a gear of the type set forth for operating farming machines which are propelled by tractors.

According to the present invention a crank is used for the lifting and lowering operation and a gearing comprising a reversing device is provided between the tractor motor and the crank whereby the direction of revolution of the crank can be reversed. Reversing may be accomplished by means of a conventional claw coupling which may be actuated, for example, by means of a hand lever, said coupling being arranged between the gear wheels for clockwise and counter-clockwise revolution. Bevel or spur gear wheels may be used for the reduction gearing. Instead of a claw coupling, a friction coupling may be employed. Preferably the coupling is operated automatically, by means of abutments which are actuated by the crank, i. e., the abutments may move together with the crank and abut against the hand lever or they may be connected with the hand lever and abut against the crank. For this purpose the crank may be rigidly connected with a disk to which bolts or the like serving as abutments may be attached at suitable points. In order to secure the center position of the lever, it is preferably connected with a spring actuated locking means which cooperates with a suitable recess in the gear casing when the coupling is disengaged and the hand lever is in center position.

The abutments may be so arranged that changing of the direction of revolution of the crank, i. e., switching from lifting to lowering operation and vice versa takes place when the crank reaches dead center position. It is not necessary, however, that starting and stopping of the lifting and lowering operation of the implement coincides exactly with the dead center of the crank motion in order to assure shockless operation; it is sufficient when starting and stopping takes place in the neighborhood of the dead center position of the crank. With such an arrangement the operating elevation or depth of the implement can be changed to a sufficient degree. The abutments may be so arranged, that they effect switching or disconnection at the moment at which the implement or its tools have reached, when lowered, the desired operation position. In case the abutment is so adjusted as to set the implement in operating or working position the implement or its tools are pressed against the ground so that engagement of the ground is definitely assured.

Sometimes it is desirable to make minor changes in the elevation of the implement pulled by the tractor while the implement is in operation. For this purpose automatically operating disengaging devices are provided according to the invention whereby the implement can be lifted or lowered to the desired extent from any position. This may be accomplished, for example, by providing notches on the periphery of the crank disk which are disengagingly engaged by means of a spring-loaded latch member. In certain implements, for example grass mowers, aside from the lowermost or operating position and the uppermost or rest position an intermediary position is desired for cleaning the implement. The present invention also meets this requirement by the provision of an automatic disengaging device: the hand lever is connected with a spring actuated locking mechanism which displaces, for example by means of a wedge guide, a pin member which serves as abutment for the crank.

Further and other objects of the present invention will be hereinafter set forth in the accompanying specification and claims and shown in the drawings which, by way of illustration, show what I now consider to be preferred embodiments of my invention.

In the drawings:

Figure 1 is a part sectional side view of the lifting gearing according to the present invention.

Figure 2 is a sectional view of the gearing illustrated in Figure 1 and taken along line II—II in said figure.

Figure 3 is a sectional view of the gearing shown in Figure 1 taken along line III—III in said figure.

Figure 4 is a diagrammatic cross sectional view of a detail of the mechanism shown in Figure 1.

Figure 5 is a part sectional view of a modification of a detail of the mechanism according to the present invention.

Figure 6 illustrates a detail of the mechanism according to the invention.

Figure 7 is a diagrammatic view of a detail of the mechanism according to the present invention in a particular operating position.

Figure 8 is a part sectional view of a modified detail of the mechanism according to the present invention.

Like parts are designated by like numerals in all figures of the drawings.

Referring more particularly to Figures 1 and 2 of the drawings, 1 represents a driving wheel which is continuously operated in the same direction of revolution by means of the tractor motor. Bevel gear wheels 2 and 3 serve for alternately operating the lifting gearing according to the invention in one direction or in reverse direction; wheels 2 and 3 are loosely arranged on a shaft 5 and are continuously operated by driving wheel 1. A glide member 4 is axially slidingly and unrotatingly attached to shaft 5 and adapted to alternately cooperate with its claws with corresponding claws attached to wheels 2 or 3 upon displacement to the left or to the right on shaft 5. The shaft 5 is thereby alternately rotated in one or the opposite direction. A self-locking worm 6 is connected with an extension of shaft 5 for driving a worm wheel 7 which is also shown in Figure 3. The worm wheel 7 is arranged on a shaft 8 which carries a crank arm 9 having a pin 10. The implement to be lifted or lowered is connected with pin 10 by means of suitable connecting means. A hand lever 12 is arranged concentrically with worm wheel 7 and extends outside of gear casing 11. Lever 12 is connected in any suitable manner with a shifting rod 13 adapted to operate glide member 4. By manipulation of lever 12 glide member 4 can be displaced and crank 9 can be made to rotate clockwise or counterclockwise.

According to the invention the rotation of crank 9 is automatically stopped as soon as the crank approaches dead center position. For this purpose a disk 14 is arranged on shaft 8 and rigidly connected with crank 9. Pins 15 and 16 are screwed into disk 14 in the neighborhood of the dead center positions which pins serve as abutments for the lever 12. In case, upon rotation of the crank 9, for example the abutment 15 moves towards the hand lever 12 said lever is also displaced and consequently glide member 4 is shifted. The abutment bolts 15 and 16 can be screwed into disk 14 at any suitable point, for example 17, whereby different extents of rotation of crank 9 can be obtained. In order to assure that, when crank 9 stands still, the glide member 4 is definitely positioned in the center between the coupling claws of the two toothed wheels 2 and 3 without engaging said claws, i. e. when the coupling is in neutral position, a recess 18 is provided on the stationary casing 11, which recess is shown in Figure 4 and into which recess fits a latch member 19 resiliently connected with hand lever 12 and provided with inclined flanks.

For special cases other constructions of the disengaging mechanism may be provided. If, for example, it is desired to change the position of the implement by a small lifting or lowering movement only, the following mechanism may be provided:

Notches 20 are provided on the circumference of the disk 14. A spring actuated locking peg member 21 is arranged on lever 12 which member is held in disengaging position by means of a spring when its operation is not desired as shown in Figure 5. Alternatively the peg member may be provided with a handle portion as shown in Figure 6 which handle may be swung to engage a nose 22 connected with hand lever 12. For setting the gearing the hand lever 12 may be displaced for a small angle only, for example into the neighborhood of the next adjacent notch 20 as shown in Figure 7. Simultaneously the peg 21 is brought into active position whereby the peg engages the notch. The crank 9 moves in a direction opposite to the movement previously effected by hand operation of lever 12 until the hand lever is again in its center position and glide member 4 is disengaged.

Figure 8 illustrates a mechanism by means of which the operation of the gearing can be stopped temporarily approximately in half way position as is desirable, for holding, for example, a grass mower in cleaning position. In the mechanism according to Figure 8 a spring actuated pin 23 may be brought, by means of a latching device 24 arranged on hand lever 12 for example by means of a wedge guide, into such position that the crank 9 abuts said pin and moves hand lever 12 connected with said pin until the gearing is brought to a standstill due to disengagement of glide member 4. If it is desired to further lift the grass mower after it is cleaned latch mechanism 24 is again operated whereby bolt 23 is pulled out of engagement with crank 9. Thereafter the hand lever 12 is displaced from its center position into lifting position whereupon the lifting operation takes place in the described manner up to its end position which is determined by the abutments 15 and 16.

The lifting gearing according to the invention is so constructed that the gearing including the shifting mechanism and the disengaging and latching devices forms a self-contained constructional group which may be added to a conventional tractor. The invention is not limited to the embodiments described and shown in the drawings. Particularly the shifting mechanism as well as the disengaging and locking devices may be constructed in any other suitable manner.

I claim:

1. A gearing for lifting and lowering implements operated by a motor driven tractor, said gearing comprising crank drive means, connecting means operatively connecting said crank drive means and the motor of said tractor, said connecting means including two gear transmissions adapted to operate said crank drive means in opposite directions and coupling means for individually alternately connecting said gear transmissions with said crank drive means, and coupling disengaging means operatively connected with said coupling means and adapted to be engaged and operated by said crank drive means and disengaging said coupling means from said gear transmissions at predetermined positions of said crank drive.

2. A gearing for lifting and lowering implements operated by a tractor operated by a motor, said gearing comprising a crank drive, connecting means for operatively connecting said crank drive and the motor of said tractor, said connecting means including two gear transmissions adapted to operate said crank drive in opposite directions and coupling means for individually alternately connecting said gear transmissions with said crank drive, a disk member associated with said crank drive, abutment means attached to said disk member, and coupling disengaging means connected with said coupling means and adapted to be actuated by said abutment means for disengaging said coupling means from said gear transmissions at predetermined positions of said crank drive.

3. A gearing for lifting and lowering implements operated by a tractor operated by a motor, said gearing comprising, in combination, a crank drive, connecting means for operatively connecting said crank drive and the motor of said tractor, said connecting means including two gear transmissions adapted to operate said crank drive in opposite directions and coupling means for individually alternately connecting said gear transmissions with said crank drive; and coupling means setting means connected with said coupling means for setting same at will in desired position and adapted to be temporarily engaged and operated by said crank means, said setting means comprising automatically acting coupling means position holding means for holding said coupling means in neutral position.

4. A gearing for lifting and lowering implements operated by a tractor operated by a motor, said gearing comprising a crank drive, connecting means for operatively connecting said crank drive and the motor of said tractor, said connecting means including two gear transmissions adapted to operate said crank drive in opposite directions and coupling means for individually alternately connecting said gear transmissions with said crank drive, coupling means operating means including a hand lever, a disk member associated with said crank drive, and auxiliary coupling means operatively connected with said hand lever and adapted to temporarily connect said hand lever and said disk member in any desired relative position of said lever and disk member.

5. A gearing for lifting and lowering implements operated by a tractor operated by a motor, said gearing comprising a crank drive, connecting means for operatively connecting said crank drive and the motor of said tractor, said connecting means including two gear transmissions adapted to operate said crank drive in opposite directions and coupling means for individually alternately connecting said gear transmissions with said crank drive, coupling means operating means including a hand lever, interlocking means operatively connected with said hand lever and adapted to temporarily interlock said coupling means operating means and said crank drive.

6. A gearing for lifting and lowering implements operated by a motor driven tractor, said gearing comprising a reversible gear connected to and driven by the motor of said tractor and a crank means operatively connected to and driven by said gear, a clutch means associated with said gear, and a clutch operating means associated with said clutch means and with said crank means and adapted to be temporarily engaged and operated by said crank means.

7. A gearing as claimed in claim 6 and forming a self-contained unit adapted to be attached as a whole to a tractor.

8. A gearing as set forth in claim 6 in which said clutch operating means comprise a hand lever swingably about the axis of rotation of said crank means.

9. A gearing for lifting and lowering implements operated by a motor driven tractor, said gearing comprising a reversible gear connected to and driven by the motor of said tractor and a crank means operatively connected to and driven by said gear, a clutch means associated with said gear, and a clutch operating means associated with said clutch means and with said crank means and comprising a lever means swingable about the axis of rotation of said crank means and adapted to be temporarily abuttingly engaged and operated by said crank means.

10. A gearing for lifting and lowering implements operated by a motor driven tractor, said gearing comprising a reversible gear connected to and driven by the motor of said tractor and a crank means operatively connected to and driven by said gear, a clutch means associated with said gear, a clutch operating means associated with said clutch means and comprising a lever means swingable about the axis of rotation of said crank means, a disk member associated with said crank means, and abutment means associated with said disk member and adapted to temporarily engage and operate said lever means.

11. A gearing for lifting and lowering implements operated by a motor driven tractor, said gearing comprising a reversible gear connected to and driven by the motor of said tractor and a crank means operatively connected to and driven by said gear, a clutch means associated with said gear, a clutch operating means associated with said clutch means and with said crank means and adapted to be temporarily engaged and operated by said crank means, a housing for said reversible gear, said housing comprising a rest means, a latch means associated with said clutch operating means and adapted to temporarily engage said rest means when said lever means and clutch operating means are in neutral position and holding said lever means and said clutch means in neutral position.

12. A gearing for lifting and lowering implements operated by a motor driven tractor, said gearing comprising a reversible gear connected to and driven by the motor of said tractor and a crank means operatively connected to and driven by said gear, a clutch means associated with said gear, a clutch operating means associated with said clutch means and comprising a lever means swingable about the axis of rotation of said crank means, a disk member associated with said crank means, abutment means associated with said disk member and adapted to temporarily engage and operate said lever means, a spring loaded latch means associated with said lever means, and rest means associated with said disk member and adapted to be temporarily engaged by said latch means for temporarily interconnecting, at will, said crank means and said lever means.

13. A gearing for lifting and lowering implements operated by a motor driven tractor, said gearing comprising a reversible gear connected to and driven by the motor of said tractor and a crank means operatively connected to and driven by said gear, a clutch means associated with said gear, and a clutch operating means associated with said clutch means and comprising a lever means swingable about the axis of rotation of said crank means, an abutment means movably connected with said lever means and adapted to be moved in position for temporary engagement with said crank means for operation of said lever means by said crank means, a spring loaded operating means movably connected with said lever means and with said abutment means for moving said abutment means in and out of engagement position with said crank means.

ANTON LENTZ.